United States Patent
Xu et al.

(10) Patent No.: US 11,092,275 B1
(45) Date of Patent: Aug. 17, 2021

(54) AUTOMATIC DRAINING DEVICE FOR CONDENSED WATER OR LEAKING WATER IN AERATION PIPELINE

(71) Applicant: HOHAI UNIVERSITY, Nanjing (CN)

(72) Inventors: Ming Xu, Nanjing (CN); Jiashun Cao, Nanjing (CN); Chao Li, Nanjing (CN); Xiaoxiao Shen, Nanjing (CN)

(73) Assignee: HOHAI UNIVERSITY, Nanjing (CN)

( * ) Notice: Subject to any disclaimer, the term of this patent is extended or adjusted under 35 U.S.C. 154(b) by 536 days.

(21) Appl. No.: 16/095,246

(22) PCT Filed: Feb. 27, 2018

(86) PCT No.: PCT/CN2018/077298
§ 371 (c)(1),
(2) Date: Oct. 19, 2018

(87) PCT Pub. No.: WO2019/075979
PCT Pub. Date: Apr. 25, 2019

(30) Foreign Application Priority Data

Oct. 18, 2017 (CN) .......................... 201710970738.4

(51) Int. Cl.
| F16L 55/07 | (2006.01) |
| C02F 7/00 | (2006.01) |
| G05D 9/02 | (2006.01) |
| F16K 24/06 | (2006.01) |
| F16K 33/00 | (2006.01) |

(52) U.S. Cl.
CPC ................ *F16L 55/07* (2013.01); *C02F 7/00* (2013.01); *G05D 9/02* (2013.01); *F16K 24/06* (2013.01); *F16K 33/00* (2013.01); *Y10T 137/3046* (2015.04); *Y10T 137/3049* (2015.04)

(58) Field of Classification Search
CPC .......... F16K 24/06; F16K 31/24; F16K 31/26; F16K 33/00; Y10T 137/3046; Y10T 137/3049; C02F 7/00; F16T 1/30; F16T 1/305
See application file for complete search history.

(56) References Cited

U.S. PATENT DOCUMENTS

| 1,890,591 A | * | 12/1932 | Shank | ........................ F16T 1/28 |
| | | | | 137/185 |
| 2,540,097 A | * | 2/1951 | Carson | .................... F16T 1/305 |
| | | | | 237/67 |

(Continued)

FOREIGN PATENT DOCUMENTS

| FR | 475227 A | * | 4/1915 | .............. F16T 1/305 |
| WO | WO-0235142 A2 | * | 5/2002 | .............. F16T 1/383 |

*Primary Examiner* — Hailey K. Do
(74) *Attorney, Agent, or Firm* — CBM Patent Consulting, LLC (57) ABSTRACT

An automatic draining device for condensed water or leaking water in an aeration pipeline comprises a water tank, a draining and exhausting stand pipe and a float bowl valve. According to the automatic draining device, the condensed water or the leaking water is sprayed out through pressurized air; under the condition that the condensed water or the leaking water in the aeration pipeline is basically drained, the outlet is basically closed, only allowing little gas to flow out; and meanwhile, when water is accumulated in the pipeline, the water outlet can be automatically opened widely to drain the accumulated water rapidly.

7 Claims, 7 Drawing Sheets

(56) References Cited

U.S. PATENT DOCUMENTS

| | | | | | |
|---|---|---|---|---|---|
| 4,631,760 | A | * | 12/1986 | Leishman | E03D 1/16 |
| | | | | | 4/300 |
| 5,065,785 | A | * | 11/1991 | Deacon | F16T 1/305 |
| | | | | | 137/185 |

* cited by examiner

Nothing

Leaking water and air

FIG. 6

Condensed water and air

AUTOMATIC DRAINING DEVICE FOR CONDENSED WATER OR LEAKING WATER IN AERATION PIPELINE

TECHNICAL FIELD

The present invention relates to an automatic draining device and method of a water treatment aeration pipeline, in particular to an automatic draining device and method for condensed water or leaking water in an aeration pipeline.

BACKGROUND ART

In the process of water treatment, the fan conveys hot air to the aeration pipeline, and the moisture in the hot air is condensed into liquid water in the pipeline. The condensed water will increase the wind resistance of the pipeline and destroy the uniform aeration effect. At present, the conventional engineering practice is to provide a condensed water emptying pipe at the tail end of the aeration branch pipe, which extends from the bottom of the tank to a position above the tank surface, and the condensed water emptying pipe is provided with a valve at the tail end, which is always in a semi-open state and sprays condensed water while exhausting air. At present, the shortcomings of this method lie in great gas waste and high energy consumption; in the case of leakage of a large amount of activated sludge in the pipeline, when the fan is restarted, the accident leaking water cannot be drained in time since the condensed water emptying pipe is thin, the solid in the leaking water will cause serious blockage of the aeration head since the solid is sprayed out at the aeration head due to pressure, air cannot be exhausted when the situation is serious, and it needs to be emptied and repaired, finally resulting in economic losses reaching several hundred thousand Chinese Yuan. In order to ensure the stable operation of the aeration system, it is urgent to find a best way to drain the water and sewage from the aeration pipeline.

CN201010523351.2 has disclosed a dynamic drainage device for condensed sewage. By automatically opening a pressure control valve, the pressure is adjusted so that the condensed sewage in the drain pipe is transferred from the liquid phase to the gas phase, and is automatically drained through the drain pipe. Then the pressure control valve is automatically closed because of the pressure change, so as to avoid the air escaping from the air pipe, and because the pressure control valve operates automatically, manual operation is not needed; and when the gap between the lower end of the drain pipe and the bottom of the air pipe is filled with condensed water, the air can also pass through the small holes in the wall of the drain pipe to facilitate the diffusion of air when it is blocked, or is exhausted through the drain pipe to avoid accidents caused by excessive pressure.

In the past, the sewage treatment plants operate extensively, aeration air volume is fixed, high energy consumption is caused, and during normal operation, the amount of condensed water is small. However, at present, the sewage treatment plants implement precise aeration and will strategically reduce or shut down aeration of some areas, and at this moment, it is easy to lead to the accumulation of a large amount of liquid in the pipeline. In addition, because the aeration system has been running for a long time in the sewage treatment plants, it is common to shut down the fan for maintenance and remove the aeration head for maintenance. Because of the large treatment amount of sewage, in order to ensure no shutdown, most of the sewage treatment plants do not discharge activated sludge from the biochemical tanks, but maintain the aeration head by artificial diving, and at this moment, a large amount of activated sludge can also easily enter the aeration pipeline. The shortcoming of the device disclosed by CN201010523351.2 lies in that, when sewage enters the pipeline, pollutants will block a large amount of sewage which cannot be transferred from the liquid phase to the gas phase within a short time, resulting in the structure cannot work, even if not blocked, because the passage can only handle a small amount of condensed water, a large amount of sewage cannot be quickly removed from the pipeline, eventually the fan pressure is too high, the sewage overflows from the aeration head, the aeration head is seriously blocked, and more seriously, startup for aeration cannot be realized. The design structure in the present invention takes into account the problem of drainage of a small amount of condensed water and a large amount of leaking water. When there is sewage in the pipe, the sewage is quickly drained from the exhausting stand pipe with the same diameter as the aeration branch pipe, and after the sewage is basically drained and when air is exhausted, the float bowl valve automatically enters a nearly closed state.

CN201420192558.X has disclosed an automatic draining device for accumulated water in an aeration air supply pipeline, comprising a valve body main body, a threaded inner cover, a check valve core, and a ventilation pipe. The valve body main body is fixed at one end of the ventilation pipe; the valve body main body has a hollow cavity, the side facing the ventilation pipe is a water inlet end, and the side back to the ventilation pipe is an outlet end; the check valve core is provided at the middle part of the threaded inner cover; the outer side of the water inlet end of the valve body main body is provided with a thread matching that of the threaded inner cover, and the threaded inner cover is in threaded connection with the water inlet end of the valve body main body. The utility model not only can drain condensed water from the pipe on line during aeration, but also can prevent the backflow of sewage outside the pipe, and has the advantages of low cost and convenience in maintenance. The shortcoming of the above-mentioned device lies in that it can only be used to drain condensed water. At present, due to long-term operation of sewage treatment plants, it is common that shutdown is performed for fan maintenance and the aeration head falls off. If a large amount of leaking sewage is not drained in time and it is drained from the aeration head, the aeration head will be seriously blocked.

CN201520702223.2 has disclosed an automatic draining device for a trap in an aeration system, comprising an aeration air pipe. The aeration air pipe is vertically provided with a trap pipe, the height of the trap pipe is greater than the height of the highest liquid level of the aeration tank, and the upper end of the trap pipe is provided with a trap solenoid valve; the two sides of the internal part of the tail end of the aeration air pipe are provided with electrodes, and the electrodes are electrically connected with a 24V power supply, a relay and the trap solenoid valve to form a control loop. By providing the two electrodes on both sides of the tail end of the aeration air pipe and on the central line of the pipe, when the water accumulated in the aeration air pipe reaches a certain height, it touches the electrodes and the two electrodes with the 24V power supply form a closed loop, the signal is detected by the relay installed in the closed loop, then the trap solenoid valve is controlled to open, and the mixture of water and air is drained from the trap pipe; and with the removal of water in the aeration air pipe, the liquid level drops, the closed loop is disconnected, the relay is off, the trap solenoid valve is closed, and the water drainage is completed. The shortcomings of the above-mentioned device lie in that the electrode probes are easy to cover by pollutants in sewage, consequently the detection is inaccurate, the probes of the monitoring equipment in sewage treatment needs frequent cleaning and maintenance, and since the motor of the above-mentioned device is located in the pipe at the bottom of the tank, consequently the electrodes cannot be maintained. In addition, since the 24V power supply is provided on the sewage tank and the corrosiveness of the sewage is strong, the maintenance and management of the equipment are very difficult to carry out. The present invention has the advantages that the water is drained immediately when the water exists in the pipe, a small amount of gas is leaked immediately when the gas exists in the pipe to prevent a large amount of gas leaks, the operation is simple, the stability and reliability are high, the manufacturing cost is low and the reconstruction is easy to perform.

SUMMARY OF THE INVENTION

Purpose of the present invention: In order to overcome the shortcomings of the above-mentioned technologies, the present invention provides an automatic draining device for condensed water or leaking water in an aeration pipeline, which uses pressurized air to spray out condensed water or leaking water, basically closes the outlet when the condensed water or leaking water in the aeration pipe is basically drained, allowing only little gas to flow out, and meanwhile, can also widely open the water outlet to quickly drain the accumulated water when water is accumulated in the pipeline. The drainage and sewage discharge structure has the advantages of automatic drainage and sewage discharge, simple structure, low manufacturing cost, and can greatly prolong the service life of the aeration system and improve the operation efficiency of the aeration system.

Technical solution: In order to realize the above-mentioned technical solution, the automatic draining device for condensed water or leaking water in an aeration pipeline provided by the present invention comprises a water tank, a draining and exhausting stand pipe and a float bowl valve, wherein,
an overflow tank is provided above the water tank, an emptying valve is provided below the water tank, and a limiting baffle is provided at the middle-lower portion of one side of the water tank and is used for limiting the drop height of the float bowl;
the top of the draining and exhausting stand pipe is communicated with the water tank, a draining and exhausting pipe outlet is provided in the top, one side, close to an air collecting hood, of the draining and exhausting pipe outlet is provided with a micro notch used for exhausting a small amount of gas and draining condensed water to enable the float bowl valve to be always kept in a closed state, gas in an aeration pipe leaks out only from the micro notch, and the bottom of the draining and exhausting stand pipe is communicated with the bottom of an aeration branch pipe;
a check valve is provided at a position close to the bottom inside the water tank and below the draining and exhausting pipe outlet; and
the float bowl valve is provided inside the water tank, the float bowl valve comprises a float bowl, an air collecting device and a valve plug lever, and the air collecting device is communicated with the lower portion of the float bowl and is used for collecting air in the water tank into the float bowl; a valve plug is provided at the bottom of the valve plug lever, and when an amount of gas in the float bowl reaches a maximum, the float bowl floats, and the float bowl drives the lever to gradually move the valve plug close to a position above the draining and exhausting stand pipe to close the draining and exhausting pipe outlet in the top of the draining and exhausting stand pipe; and when no gas exists in the float bowl, the edge of one side of the float bowl falls onto the limiting baffle due to gravity, and the float bowl drives the valve plug to get far away from the draining and exhausting pipe outlet through the lever.

Preferably, the float bowl is conical to facilitate gas to leak out from a micro air-leaking valve, an adjustable micro air-leaking valve is provided at the conical top of the float bowl, the micro air-leaking valve is a vertical pipe and is provided with a horizontal screw capable of adjusting the aeration area of the mouth of the vertical pipe, and it is workable as long as inlet gas is equal to gas released by the micro air-leaking valve during commissioning.

The air collecting device comprises an air guide pipe and the air collecting hood which are sequentially connected, and the air guide pipe is provided at the middle-lower portion of the outer wall of the float bowl and is communicated with the float bowl.

The air guide pipe and the horizontal direction form an angle of 10-25°, and the air collecting hood is a conical air collecting hood.

The valve plug lever comprises a horizontal bar and an inclined bar which are sequentially connected, the inclined bar is inclined obliquely downwards and the vertically downward valve plug is provided at the bottom.

A float bowl support is provided in the water tank, the valve plug lever at a position far away from the float bowl is provided with a fulcrum for the float bowl support, the valve plug lever is movably hinged with the float bowl support through the fulcrum, and one side of the float bowl support is provided with an air guide pipe fixing bar; and the side of the float bowl support is provided with a draining and exhausting stand pipe through hole, the bottom plane of the float bowl is configured to be 0.1 m below a liquid level and the side surface is fixed on a tank wall through expansion screws.

A movable joint is provided at the bottom of the water tank to facilitate connection.

Beneficial effects: According to the automatic draining device for condensed water or leaking water in a water treatment aeration pipeline provided by the present invention, the condensed water or the leaking water is drained through pressurized air; under the condition that the condensed water or the leaking water in the aeration pipeline is basically drained, the outlet is basically closed, only allowing little gas to flow out; and when the fan is shut down or water is accumulated in the pipeline, the draining and exhausting outlet can be opened to the largest extent through the air-leaking float bowl, the automatic high-capacity draining and air blocking functions are realized, the structure is simple, the manufacturing cost is low, and the application is facilitated.

DETAILED DESCRIPTION OF THE INVENTION

The present invention will be further described below with reference to the drawings.

As illustrated in FIG. 1 to FIG. 7, an automatic draining device for condensed water or leaking water in an aeration pipeline provided by the present invention comprises a water tank 1, a draining and exhausting stand pipe 3 and a float bowl valve 2, wherein, an overflow tank 1.1 is provided above the water tank, an emptying valve 1.5 is provided below the water tank, a limiting baffle 1.2 is provided at the middle-lower portion of one side of the water tank, and a movable joint 3.3 is provided at the bottom; the top of the draining and exhausting stand pipe 3 is communicated with the water tank, a draining and exhausting pipe outlet 3.4 is provided in the top, one side, close to an air collecting hood, of the draining and exhausting pipe outlet is provided with a notch 3.41, and the bottom of the draining and exhausting stand pipe is communicated with the bottom of an aeration branch pipe; and a check valve is provided at a position close to the bottom inside the water tank and below the draining and exhausting pipe outlet.

Figure 1:
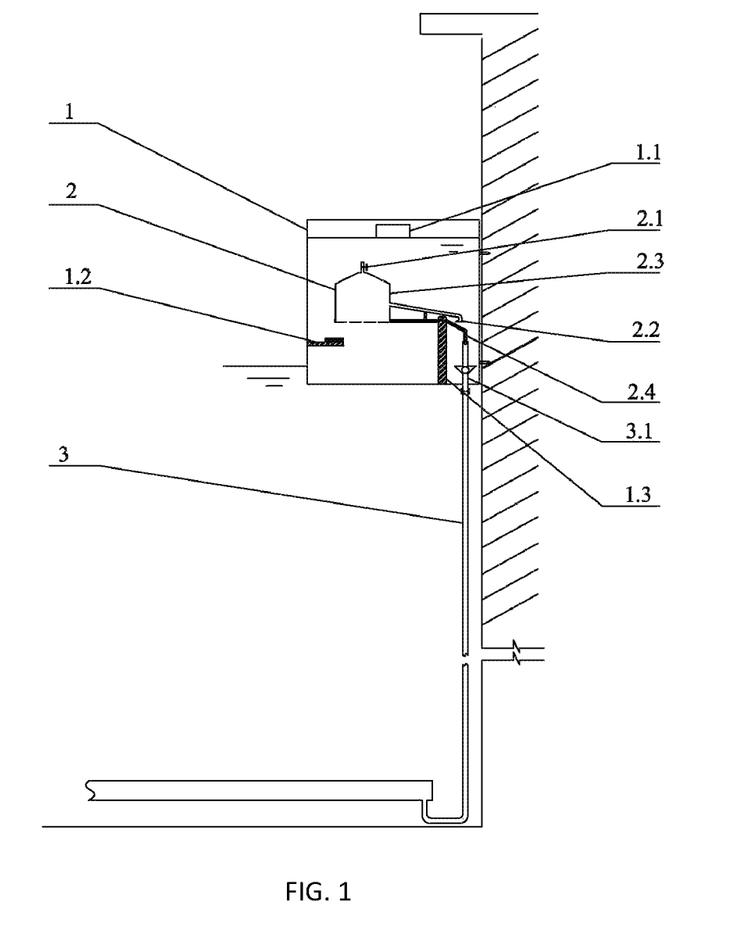
FIG. 1 is an overall structural schematic view of the present invention.
Figure 2:
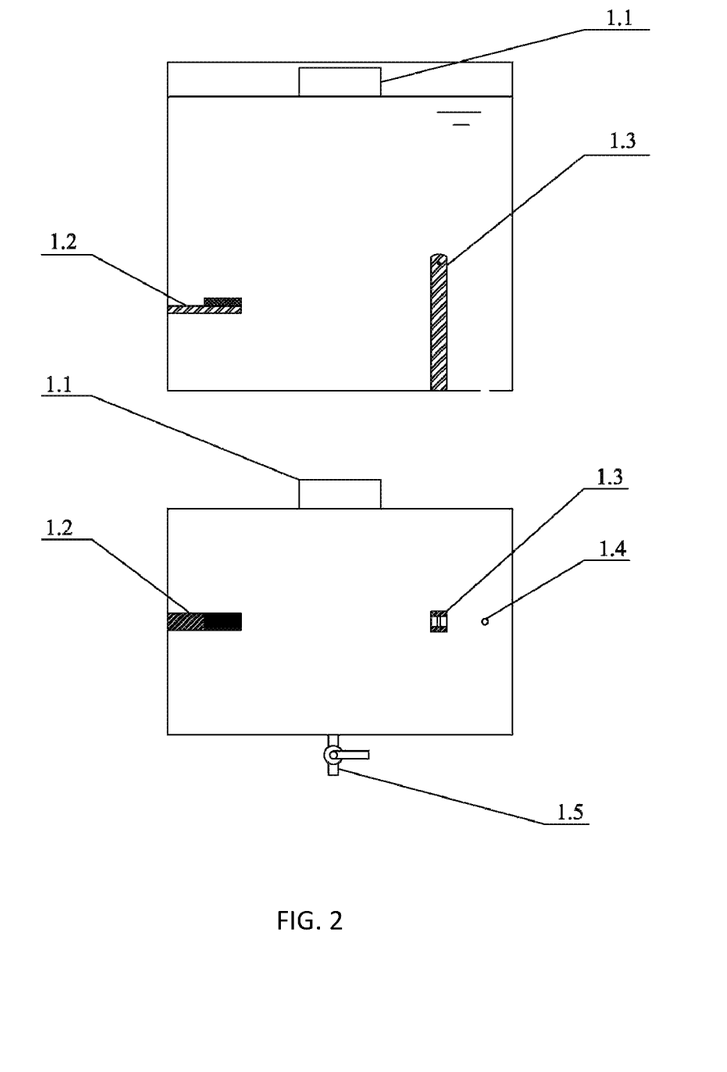
FIG. 2 is a structural schematic view of a water tank in the present invention.
Figure 3:
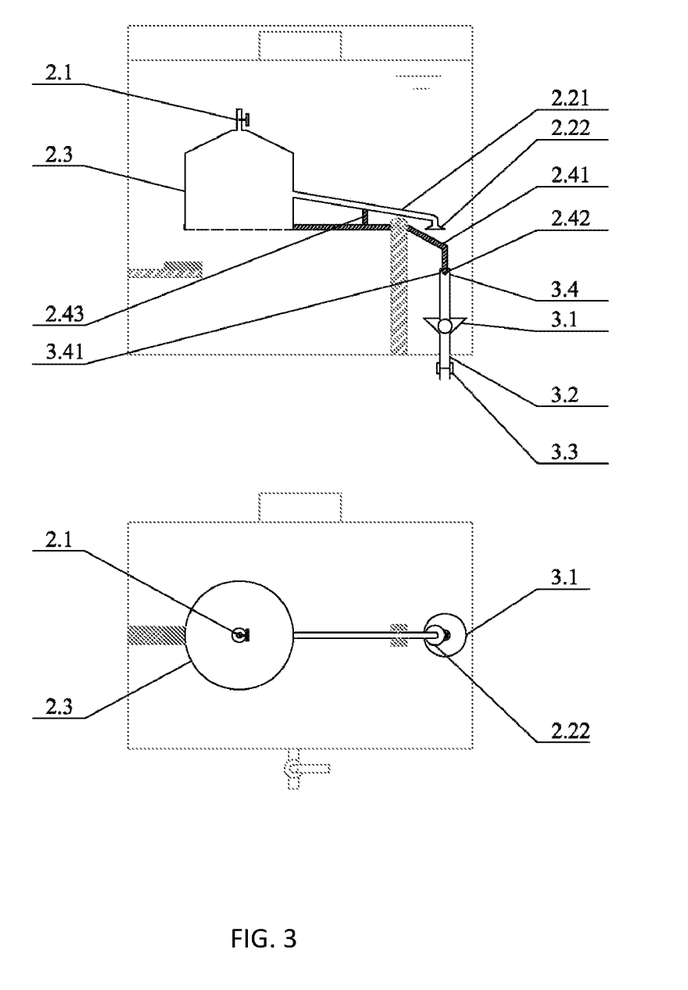
FIG. 3 is a structural schematic view of a float bowl valve and a draining and exhausting stand pipe in the present invention.

The float bowl valve 2 is provided inside the water tank, the float bowl valve comprises a float bowl 2.3, an air collecting device 2.2 and a valve plug lever 2.4, the float bowl is conical, an adjustable micro air-leaking valve 2.1 is provided at the conical top of the float bowl, the micro air-leaking valve is a vertical pipe and is provided with a horizontal screw capable of adjusting the aeration area of the mouth of the vertical pipe, and it is workable as long as inlet gas is equal to gas released by the micro air-leaking valve during commissioning.

The air collecting device is communicated with the lower portion of the float bowl and is used for collecting air in the water tank into the float bowl, the air collecting device comprises an air guide pipe 2.21 and the air collecting hood 2.22 which are sequentially connected, the air guide pipe is provided at the middle-lower portion of the outer wall of the float bowl and is communicated with the float bowl, the air guide pipe and the horizontal direction form an angle of 15°, and the air collecting hood is a conical air collecting hood.

The valve plug lever 2.4 comprises a horizontal bar and an inclined bar which are sequentially connected, the inclined bar is inclined obliquely downwards and a vertically downward valve plug 2.42 is provided at the bottom.

A float bowl support is provided in the water tank, the valve plug lever at a position far away from the float bowl is provided with a fulcrum for the float bowl support, the valve plug lever is movably hinged with the float bowl support through the fulcrum, and one side of the float bowl support is provided with an air guide pipe fixing bar 2.43; and the side of the float bowl support is provided with a draining and exhausting stand pipe through hole, the bottom plane of the float bowl is configured to be 0.1 m below a liquid level and the side surface is fixed on a tank wall through expansion screws.

During use, the device is installed. Before the air blower is started, no water is drained or air is exhausted by the draining and exhausting stand pipe, the check valve of the stand pipe stops the substance in the water tank from entering the draining and exhausting stand pipe, no gas exists in the float bowl, the edge of one side of the float bowl falls onto the limiting baffle due to gravity, and the float bowl drives the valve plug to get far away from the draining and exhausting pipe outlet through the lever, as illustrated in FIG. 4.

Figure 5:
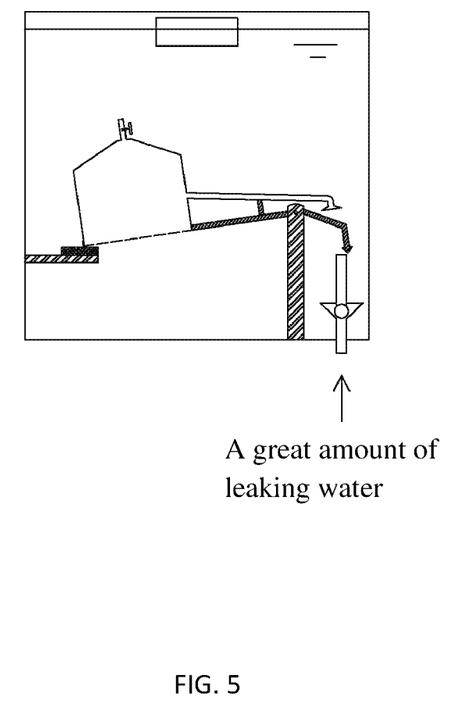
FIG. 5 is a schematic view of the position of the float bowl valve when a great amount of water is accumulated in the aeration pipeline in the present invention.
Figure 6:
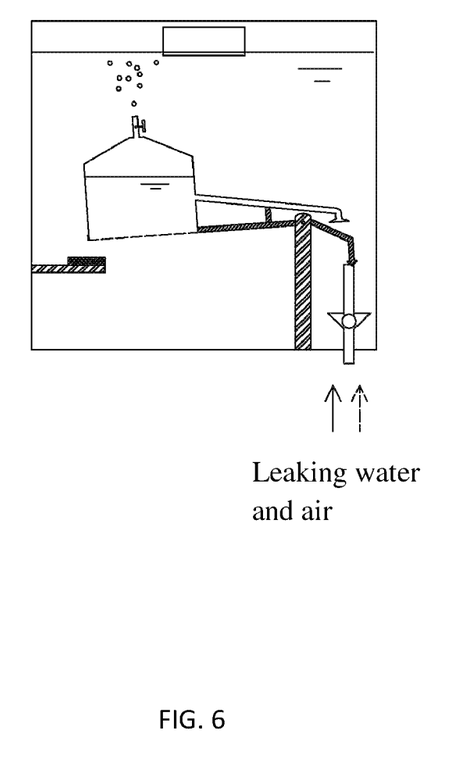
FIG. 6 is a schematic view of the position of the float bowl valve when a small amount of water is accumulated in the aeration pipeline in the present invention.

The water treatment air blower is started. At this moment, a great amount of liquid exists in the draining and exhausting stand pipe and is drained from the draining and exhausting stand pipe under the effect of atmospheric pressure, the check valve is flushed open, the liquid enters the water tank, and the liquid in the water tank overflows from the overflow tank above, as illustrated in FIG. 5. With the gradual emptying of the liquid, leaking water with air enter the water tank, the air collecting hood in the water tank collects part of the air into the float bowl, when the amount of the air exhausted from the float bowl is greater than the amount of air entering the float bowl, the air in the float bowl increases gradually, and when the amount of air increases to a certain extent, the float bowl gradually floats and the float bowl drives the lever to gradually move the valve plug close to a position above the draining and exhausting stand pipe, as illustrated in FIG. 6. With the gradual emptying of the leaking water in the pipe, the valve plug above the draining and exhausting stand pipe is nearly closed, there is a small notch in the side, close to the air collecting hood, of the draining and exhausting stand pipe, a small amount of gas and condensed water are discharged from this position and collected by the gas collecting hood above, at this moment, the amount of the gas collected at the micro air-leaking valve is slightly greater than that of the exhausted gas, an amount of gas in the float bowl is at a maximum, the buoyancy is the maximum, and this state is the long-term working state of the device, as illustrated in FIG. 7.

Figure 4:
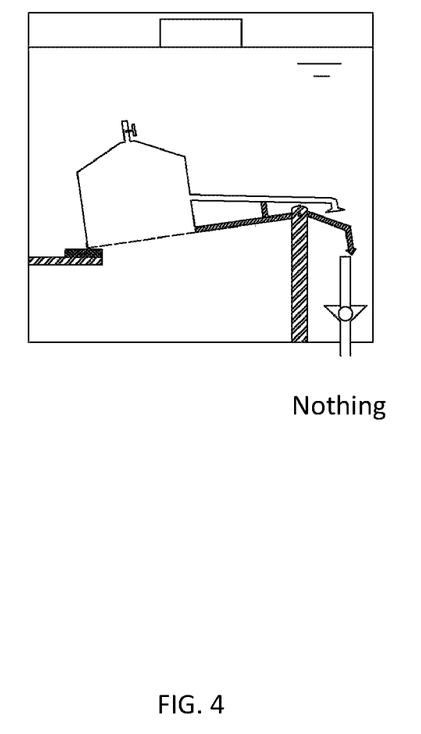
FIG. 4 is a schematic view of the position of the float bowl valve when an air blower is shut down in the present invention.
Figure 7:
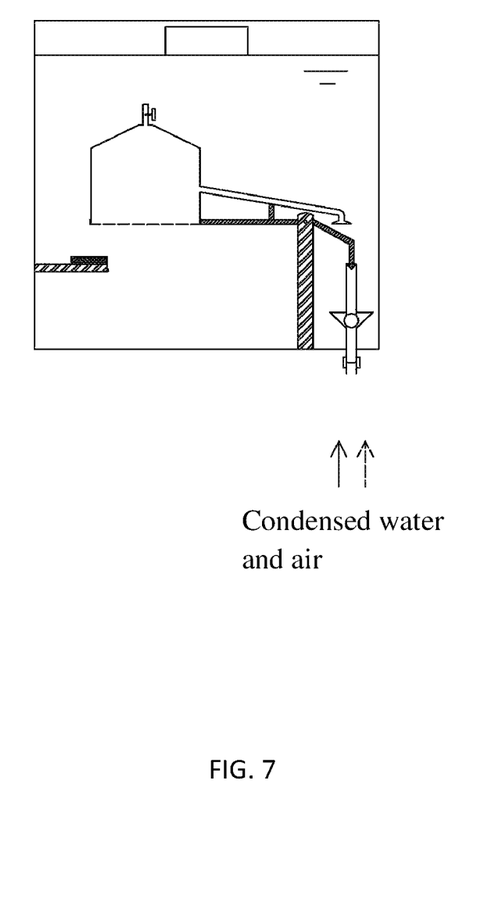
FIG. 7 is a schematic view of the position of the float bowl valve when the aeration pipe works normally in the present invention.

When the air blower stops working due to accidents (power outage, maintenance, etc.), the device gradually changes from the state illustrated in FIG. 7 to the state illustrated in FIG. 4 due to the effect of the micro air-leaking valve. At the same time, due to the liquid pressure above the aeration head, a great amount of leaking water enters the aeration pipe. When the air blower is restarted, the leaking water is drained from the draining and exhausting stand pipe due to pressure and the state is as illustrated in FIG. 5, and when the leaking water is gradually emptied, the state is as illustrated in FIG. 6. When the leaking water is basically emptied and only a small amount of condensed water exists, the aeration pipeline is in a normal working condition, as illustrated in FIG. 7.

When the aeration state of the transition tank is adjusted from OFF to ON, the initial state is as illustrated in FIG. 4. When the air supply valve is opened, the pressurized gas enters the aeration pipe, and the leaking water in the aeration pipeline is quickly drained from the draining and exhausting stand pipe, as illustrated in FIG. 5, and when the amount of the leaking water gradually decreases, a small amount of gas is exhausted therewith and the device enters the state illustrated in FIG. 6. However, when the leaking water is gradually emptied and only the condensed water exists, the device is in the long-term working state as illustrated in FIG. 7.

According to the automatic draining device for condensed water or leaking water in a water treatment aeration pipeline provided by the present invention, the condensed water or the leaking water is drained through pressurized air; under the condition that the condensed water or the leaking water in the aeration pipeline is basically drained, the outlet is basically closed, only allowing little gas to flow out; and when the fan is shut down or water is accumulated in the pipeline, the draining and exhausting outlet can be opened to the largest extent through the air-leaking float bowl, the automatic high-capacity draining and air blocking functions are realized, the structure is simple, the manufacturing cost is low, and the application is facilitated.

What is claimed is:

1. An automatic draining device for condensed water or leaking water in an aeration pipeline, the automatic draining device comprising: a water tank, a draining and exhausting stand pipe and a float bowl valve, wherein,
    an overflow tank is provided above the water tank, an emptying valve is provided below the water tank, and a limiting baffle is provided at a middle-lower portion of one side of the water tank;
    a top of the draining and exhausting stand pipe is communicated with the water tank, a draining and exhausting pipe outlet is provided in the top of the draining and exhausting stand pipe, the draining and exhausting pipe outlet is provided with a micro notch on one side close to an air collecting hood, wherein
    the micro notch enables the float bowl valve to be always kept in a closed state, gas in an aeration pipe leaks out only from the micro notch, and a bottom of the draining and exhausting stand pipe is communicated with a bottom of an aeration branch pipe;
    a check valve is provided at a position close to a bottom of an inside of the water tank and below the draining and exhausting pipe outlet; and
    the float bowl valve is provided inside the water tank, the float bowl valve comprising: a float bowl, an air collecting device and a valve plug lever, and the air collecting device is communicated with a lower portion of the float bowl and is used for collecting air in the water tank into the float bowl;
    a valve plug is provided at a bottom of the valve plug lever, and when an amount of gas in the float bowl reaches a maximum, the float bowl floats, and the float bowl drives the valve plug lever to gradually move the valve plug close to a position above the draining and exhausting stand pipe to close the draining and exhausting pipe outlet in the top of the draining and exhausting stand pipe; and
    when no gas exists in the float bowl, an edge of one side of the float bowl falls onto the limiting baffle due to gravity, and the float bowl drives the valve plug to get far away from the draining and exhausting pipe outlet through the valve plug lever.

2. The automatic draining device for condensed water or leaking water in an aeration pipeline according to claim 1,
    the float bowl has a conical top, an adjustable micro air-leaking valve is provided at the conical top of the float bowl,
    the adjustable micro air-leaking valve is a vertical pipe and is provided with a horizontal screw capable of adjusting an aeration area of a mouth of the vertical pipe, and
    the flow bowl is operable as long as inlet gas is equal to gas released by the micro air-leaking valve during commissioning.

3. The automatic draining device for condensed water or leaking water in an aeration pipeline according to claim 1,
    the valve plug lever comprises a horizontal bar and an inclined bar which are sequentially connected,
    the inclined bar is inclined obliquely downwards and the valve plug extends vertically downward from a bottom of the inclined bar.

4. The automatic draining device for condensed water or leaking water in an aeration pipeline according to claim 1, characterized in that
    a float bowl support is provided in the water tank, the valve plug lever is provided with a fulcrum for the float bowl support, wherein the fulcrum is positioned far away from the float bowl;
    the valve plug lever is movably hinged with the float bowl support through the fulcrum, and one side of the float bowl support is provided with an air guide pipe fixing bar; and
    a side of the float bowl support is provided with a draining and exhausting stand pipe through hole, a bottom plane of the float bowl is configured to be below a liquid level and a side surface of the float bowl is fixed on a tank wall through expansion screws.

5. The automatic draining device for condensed water or leaking water in an aeration pipeline according to claim 1, characterized in that a movable joint is provided at the bottom of the water tank.

6. The automatic draining device for condensed water or leaking water in an aeration pipeline according to claim 1,
    the air collecting device comprises an air guide pipe and the air collecting hood which are sequentially connected, and
    the air guide pipe is provided at a middle-lower portion of an outer wall of the float bowl and is communicated with the float bowl.

7. The automatic draining device for condensed water or leaking water in an aeration pipeline according to claim 6,
    the air guide pipe and a horizontal direction form an angle of 10-25°, and the air collecting hood is a conical air collecting hood.

* * * * *